(12) United States Patent
Win et al.

(10) Patent No.: US 9,062,978 B2
(45) Date of Patent: Jun. 23, 2015

(54) TRACKING A BODY BY NONLINEAR AND NON-GAUSSIAN PARAMETRIC FILTERING

(75) Inventors: Moe Z. Win, Framingham, MA (US); Santiago Mazuelas, Cambridge, MA (US); Yuan Shen, Cambridge, MA (US)

(73) Assignee: MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 906 days.

(21) Appl. No.: 13/149,120

(22) Filed: May 31, 2011

(65) Prior Publication Data
US 2012/0310591 A1 Dec. 6, 2012

(51) Int. Cl.
| G01C 21/20 | (2006.01) |
|---|---|
| G01C 21/16 | (2006.01) |
| G01S 19/45 | (2010.01) |
| G01S 19/47 | (2010.01) |
| G01S 5/02 | (2010.01) |

(52) U.S. Cl.
CPC ............ *G01C 21/206* (2013.01); *G01C 21/165* (2013.01); *G01S 19/45* (2013.01); *G01S 19/47* (2013.01); *G01S 5/0278* (2013.01)

(58) Field of Classification Search
CPC .. G01C 21/165; G01C 21/206; G01S 5/0278; G01S 19/47; G01S 19/45
See application file for complete search history.

(56) References Cited

U.S. PATENT DOCUMENTS

| 2003/0023192 | A1* | 1/2003 | Foxlin | 600/595 |
|---|---|---|---|---|
| 2004/0143176 | A1 | 7/2004 | Foxlin | |
| 2005/0251328 | A1 | 11/2005 | Merwe et al. | |
| 2006/0087425 | A1* | 4/2006 | Haeberlen et al. | 340/539.13 |
| 2007/0098218 | A1* | 5/2007 | Zhang et al. | 382/103 |
| 2008/0285805 | A1* | 11/2008 | Luinge et al. | 382/107 |
| 2009/0233619 | A1* | 9/2009 | Sirola et al. | 455/456.1 |
| 2013/0065605 | A1* | 3/2013 | Mirowski et al. | 455/456.1 |

OTHER PUBLICATIONS

Maggio, E.; Cavallaro, A., Hybrid Particle Filter and Mean Shift Tracker with Adaptive Transition Model. Acoustics, Speech, and Signal Processing, 2005. Proceedings. (ICASSP '05). IEEE International Conference on vol. 2, Mar. 18-23, 2005 pp. 221-224.*

Jose-Luis Blanco et al., "An Optimal Filtering Algorithm for Non-Parametric Observation Model in Robot Localization", May 19-23, 2008, IEEE Internation Conference on Robotics and Automation, pp. 461-466, DOI 978-1-4244-1647-9/08.*

Poland, William B., et al. "Mixtures of Gaussians and Minimum Relative Entropy Techniques for Modeling Continuous Uncertainties" In *Uncertainty in Artificial Intelligence: Proceedings of the Ninth Conference* (1993) 8 pages.

Dempster, A.P., et al. "Maximum Likelihood from Incomplete Data via the EM Algorithm" *Journal of the Royal Statistical Society. Series B (Methodological)*, vol. 39, No. 1. (1977), pp. 1-38.

Kotecha, Jayesh H. "Gaussian Sum Particle Filtering for Dynamic State Space Models" (2003) 4 pages.

(Continued)

*Primary Examiner* — Mischita Henson
(74) *Attorney, Agent, or Firm* — Occhiuti & Rohlicek LLP (57) ABSTRACT

A general framework for parametric filters is based on belief condensation (BC), which can cope with highly nonlinear and non-Gaussian system models. The methodology exploits the specific structure of the problem and decomposes it in such a way that the linear and Gaussian part can be solved in closed form, while the remaining parts are addressed by an optimization process, referred to as BC. Simulation results show that the performance of the proposed BC filter is close to that of the particle filter, but with a much lower complexity.

17 Claims, 6 Drawing Sheets

(56) References Cited

OTHER PUBLICATIONS

Gustafsson, Fredrick, et al. "Particle Filters for Positioning, Navigation and Tracking" *IEEE Transactions on Signal Processing* (2002) 13 pages.

Arulampalam, M. Sanjeev, et al. "A Tutorial on Particle Filters for Online Nonlinear/Non-Gaussian Bayesian Tracking" IEEE Transactions on Signal Processing, vol. 50, No. 2, Feb. 2002. 15 pages.

Maskell et al., "A Tutorial on Particle Filters for On-Line Nonlinear/Non-Gaussian Bayesian Tracking," Algorithms and Applications (Ref. No. 2001/174) Workshop, vol. 2, pp. 2/1-2/15, IEEE (2001).

Gustafsson et al., "Particle Filters for Positioning, Navigation, and Tracking," IEEE Transactions on Journals and Magazines, 50(2):425-437 (2002).

International Search Report, PCT Application No. PCT/US2012039918, issued Dec. 20, 2012 (3 pages).

\* cited by examiner

TRACKING A BODY BY NONLINEAR AND NON-GAUSSIAN PARAMETRIC FILTERING

STATEMENT AS TO FEDERALLY SPONSORED RESEARCH

This invention was made with government support under contract ECCS-0901034 awarded by the National Science Foundation. The government has certain rights in the invention.

BACKGROUND

This invention relates to tracking a body by nonlinear and non-Gaussian parametric filtering.

Tracking a body, for example a robot or other physical agent, as it moves in a physical space can be based on measurements that depend on the movement of the body in the space. For example, sensor measurements may provide partial or noisy information regarding the position of the body. Over time, such measurements can be accumulated and combined with information related to the anticipated movement of the body to track the motion of the body. In some cases, the tracking is probabilistic in that the knowledge that is gleaned from the measurements is represented as a probability distribution representing the uncertainty in the position. Generally, the process of accumulating the measurements and combining them with the anticipated movement is referred to as a type of filtering. The characteristics of the body, for example, the position, velocity, pose, etc. are together referred to as the "state" of the body.

Filtering can be applied to problems in which a state of a body evolves according to system dynamics and deterministic and/or random inputs to the system, and the system is observered via measurements ("observations") that depend on the state. A goal of filtering can include recovering an estimate of the evolution of the system state based on measurements. Such filtering of the measurements to recover the system state can be a challenging problem, for example, because the measurements are noisy (i.e., have high degree of uncertainty) or because there may not be a direct way to derive the system state from the measurements even if they were perfectly known. One example where such filtering is useful is in navigation in which the system state to be recovered includes the position and velocity of a vehicle and the measurements include reference based (e.g., GPS or beacon based) and/or interial (e.g., accelerometer or gyroscope based) sensor measurements of the vehicle's position. In the discussion below, the variables $y_1, y_2, \ldots$ refer to the state of the system at ordered discrete times $t_1, t_2, \ldots$, and the variables $z_1, z_2, \ldots$ refer to the measurements at those times.

One approach to dealing with the uncertainty in the state evolution or the relationship between the system state and sensor measurements is to use probabilistic models, such as a model for the distribution $p(y_k|y_{k-1})$ that characterizes the evolution of the state from time $t_{k-1}$ to time $t_k$, and a distribution $p(z_k|y_k)$ that characterizes the measurement distribution at time $t_k$ given a particular value $y_k$ of the system state at time $t_k$. Further assumptions on the probability distributions can be made, including a Markov assumption on the system evolution $p(y_k|y_{k-1}, \ldots, y_1) = p(y_k|y_{k-1})$ and a conditional independence assumption on the observations such that $p(z_1, \ldots, z_k|y_1, \ldots, y_k) = \Pi_i p(z_i|y_i)$.

The Markov and conditional independence assumptions used in a number of filtering techniques in which the distribution of the state at time $t_{k-1}$ based on all measurements up to that time, denoted $p(y_{k-1}|z_{1:k-1})$ where $z_{1:k-1}$ refers to the sequence $z_1, \ldots, z_{k-1}$, is updated based on $z_k$ to yield the distribution $p(y_k|z_{1:k})$. In particular, Bayes rule is used as the basis of two steps:

a) Prediction step: Determine $p(y_k|z_{1:k-1})$ from $p(y_k|y_{k-1})$ and $p(y_{k-1}|z_{1:k-1})$,
b) Update step: Determine $p(y_k|z_{1:k})$ from $p(y_k|z_{1:k-1})$, $(z_k|y_k)$, and $z_k$.

The prediction step may be implemented in the case of a continuous state space based on the equation a) Prediction equation: $p(y_k|z_{1:k-1}) = \int_{y_{k-1}} p(y_k|y_{k-1}) p(y_{k-1}|z_{1:k-1}) dy_{k-1}$, or in the case of a discrete state space as a corresponding sum over discrete state values $y_{k-1}$. The update step may be implemented based on the equation b) Update equation:

$$p(y_k|z_{1:k}) = p(y_k|z_{1:k-1}) p(z_k|y_k) \left(\frac{p(z_{1:k-1})}{p(z_{1:k})}\right),$$

which may be broken up into two steps:
b1) Unnormalized update equation: $f(y_k) = p(y_k|z_{1:k-1}) p(z_k|y_k)$, and
b2) Normalize:

$$p(y_k|z_{1:k}) = \frac{f(y_k)}{\int_y f(y) dy}$$

When the initial distribution of the system state is Gaussian as well as both dynamic and measurement models are linear-Gaussian, the prediction and update steps retain the Gaussian nature of the distributions, leading to simple closed-form solutions. The recursion given by such analytic solution is the well-known Kalman Filter. However, linear and Gaussian models are not adequate for navigation systems deployed in harsh environments, causing Kalman filters to suffer severe performance degradations. Other well-know approaches to implementing the prediction and update steps include use of a discrete state space in a Hidden Markov Model.

One approach to dealing with non-linear form of the system or observation model is to use linearize approximations of the models. Generally, some such approaches are referred to as Extended Kalman Filters.

Nonparametric techniques based on Monte Carlo sampling have also been used to handle such complex scenarios but with a computational complexity beyond the reach of many navigation devices, especially those that are small and low-cost. One such approach is refered to as a Particle Filter. Generally, such approaches represent the posterior distribution of the positional state as a set of random samples with associated weights (i.e., a probability density composed of a set of weighted impulses), each representing a "particle." The prediction and update steps generally involve moving the samples (or possibly removing and adding samples) and determining new weights for the samples.

Another technique called Rao-Blackwellized particle filter takes advantage of the specific structure by marginalizing out some of the variables analytically and solving the remaining variables using particle filters. However, since this method needs to partition the state-space, it is only useful in some specific cases.

The dimension of a filter is the number of real numbers that the filter has to store in each step, where this dimension is a measure of the complexity of the filter. For instance, Kalman-like filters have to store a mean and a covariance matrix of a state vector of size d, therefore their dimension is d(1+(d+1)/2). On the other hand, particle filters have a dimension of M(d+1), where M is the number of particles which usually has to be several orders of magnitude larger than d to achieve acceptable performances.

Each navigation problem has an underlying structure that is determined by the dynamic and measurements models. Generally, traditional techniques for navigation such as the Kalman filter do not capture the nonlinear and non-Gaussian behavior of measurements in wireless localization and navigation systems deployed in harsh environments. Nonparametric filters as particle filters can cope with the measurements behavior in such environments at the expense of a computational complexity beyond the reach of low-cost navigation devices.

In essence, suboptimal filtering techniques choose a family of distributions and perform the prediction, update, and normalization steps in such a way that the estimated posterior always lies within the same family. For example, approaches such as EKF or UKF choose the family of Gaussian distributions and make the approximations by Taylor series expansions or deterministic sample points, respectively. Particle filters use mixtures of deltas as the family to approximate the distribution. The performance of each technique in terms of accuracy and complexity depends on the suitability of the family and accuracy/complexity of the approximation process.

SUMMARY

In one aspect, in general, a new parametric filtering technique is applicable to nonlinear and/or non-Gaussian navigation problems. In some aspects, the methodology decomposes the problem in such a way that a linear-Gaussian part can still be solved in closed form, while the remaining computations are solved by a new technique for condensing a high dimensional distribution to a low dimensional one, which is referred to herein as Belief Condensation (BC). This condensation involves obtaining the distribution, which belonging to a certain family, closest (e.g., measured by Kullback-Leibler (KL) divergence) to the resulting distribution after the filtering steps. The BC filter (BCF) has a performance similar to particle filter, but with a much smaller dimension.

In another aspect, in general, a moving body having state y is tracked according to state-dependent measurements z from one or more sensors. For time each of a series of times $t_k$, a data representation characterizing a distribution (e.g., a probability distribution) of the state of the body at that time in the series is formed based on measurements up to that time. This distribution for that time $t_k$ belongs to a family of distributions $\mathcal{F}_k$ corresponding to that time. Forming the data representation characterizing the probability distribution of the state of the body at time $t_k$ includes accepting a data representation $\xi_{k-1}$ characterizing a distribution of the state $y_{k-1}$ of the system at a previous time $t_{k-1}$ without consideration of a measurement $z_k$ that depends on the state $y_k$ for the time $t_k$ in the series, for example, based only on measurements up to that previous time. This distribution belongs to a parametric family $\mathcal{F}_{k-1}$. A data representation of the measurement $z_k$ that depends on the state $y_k$ for the time $t_k$ in the series is also accepted. A first data representation characterizing a first distribution of the state $y_k$ of the body at the time $t_k$ in the series based on the measurements up to the previous time and the measurement for the time in the series is then determined. This distribution does not belong to the family $\mathcal{F}_k$ corresponding to that time $t_k$. A second data representation $\xi_k$ characterizing a second distribution of the state $y_k$ of the body at the time $t_k$ in the series based on the measurements up to the previous time and the measurement for the time in the series is then determined. This second distribution does belong to the family $\mathcal{F}_k$ corresponding to that time $t_k$ and forms an approximation of the first distribution of the state $y_k$.

Aspects can include one or more of the following features.

Each family $\mathcal{F}_k$ corresponding to each time $t_k$ comprises a family of probability distributions.

Each family $\mathcal{F}_k$ corresponding to each time $t_k$ is a family of mixture probability distributions.

Each family $\mathcal{F}_k$ corresponding to each time $t_k$ is a family of mixtures of exponential probability distributions.

The family of distributions for a plurality of times is a same family.

The first data representation characterizing a first probability distribution of the state $y_k$ of the system at the time $t_k$ comprises parameters defining a parametric distribution.

Forming the first data representation characterizing a first probability distribution of the state $y_k$ of the system at the time $t_k$ includes forming a data representation characterizing a predicted probability distribution of the state $y_k$ of the system at the time $t_k$ in the series based on the measurements up to the previous time $t_{k-1}$, and forming the data representation characterizing the first probability distribution from using the measurement $z_k$ for the time in the series and the predicted probability distribution.

Determining the second data representation $\xi_k$ characterizing a second distribution of the state $y_k$ of the system at the time $t_k$ includes iteratively forming a series of data representations $\xi_k^{[n]}$ representing corresponding successive approximations of first probability distribution of the state of the body.

Iteratively forming the series of data representations includes, at each iteration, determining expected values of statistics of a distribution of the state of the body based on the measurement $z_k$ for the time in the series and the first probability distribution of the state of the body.

Accepting the data representation of the measurement $z_k$ includes accepting a data representation of a measurement from a sensor belonging to the group consisting of location-reference based sensor and an inertial sensor.

The moving body is a mobile device, a vehicle, and/or a pedestrian.

In another aspect, in general, a tracking system is adapted for tracking a moving body having state y, according to state-dependent measurements z from one or more sensors. The tracking system comprising a tracking filter coupled to a sensor system. The tracking filter comprises a predictor configured to accepting a data representation $\xi_{k-1}$ characterizing a distribution of the state $y_{k-1}$ of the system at a each time $t_{k-1}$ in a series of times based on measurements up to that previous time, the distribution belonging to a parametric family $\mathcal{F}_{k-1}$. The tracking filter further comprises an updater configured to accept a data representation of a measurement $z_k$ that depends on the state $y_k$ for each time $t_k$ in the series of times, form a first data representation characterizing a first distribution of the state $y_k$ of the body at the time $t_k$ in the series based on the measurements up to the previous time and the measurement for the time in the series, the distribution not belonging the family $\mathcal{F}_k$ corresponding to that time $t_k$, and determining a second data representation $\xi_k$ characterizing a second distribution of the state $y_k$ of the body at the time $t_k$ in the series based on the measurements up to the previous time and the measurement for the time in the series. The second distribution belongs to the family $\mathcal{F}_k$ corresponding to that time $t_k$ and forms an approximation of the first distribution of the state $y_k$.

In another aspect, in general, a tracking method includes maintaining a data storage for data including data characterizing a distribution of a location of a mobile device as a mixture of a plurality of distribution components. The following steps are repeated at each of a series of times. A data representation of a distribution of a predicted location of the device formed based on the distribution of the location of the device and data representing motion characteristics of the device. Positioning system measurements associated with a location of the device at a sensing time are accepted. A data representation characterizing a first distribution of an updated location of the device at the sensing time is formed based on the distribution of the predicted location and the sensor measurements, including identifying a plurality of locations and corresponding weights. The data characterizing the distribution of the current location of the device is iteratively updated. The distribution of the current location forms an approximation of the first distribution of the updated location according to the identified locations and weights. In some examples, the positioning system measurements include pseudorange measurements between the device and a plurality of reference locations, which may be subject to non-linear distortions (e.g., multipath distortion and a non-line-of-sight distortion) of true range measurements between the device and the plurality of reference locations.

In another aspect, in general, software stored on a computer-readable medium comprises instructions for causing a data processing system to perform all the steps of any of the methods presented above.

In another aspect, in general, a software implemented tracking system includes a data processing system configured to perform all the steps of any of the methods presented above.

Aspects can have one or more of the following advantages.

Accurate tracking of a body is achieved with less computation than can be achieved using other available techniques, particularly in situation in which sensor measurements represent substantially non-linear functions of the system state being tracked.

Other features and advantages of the invention are apparent from the following description, and from the claims.

DESCRIPTION

Figure 1:
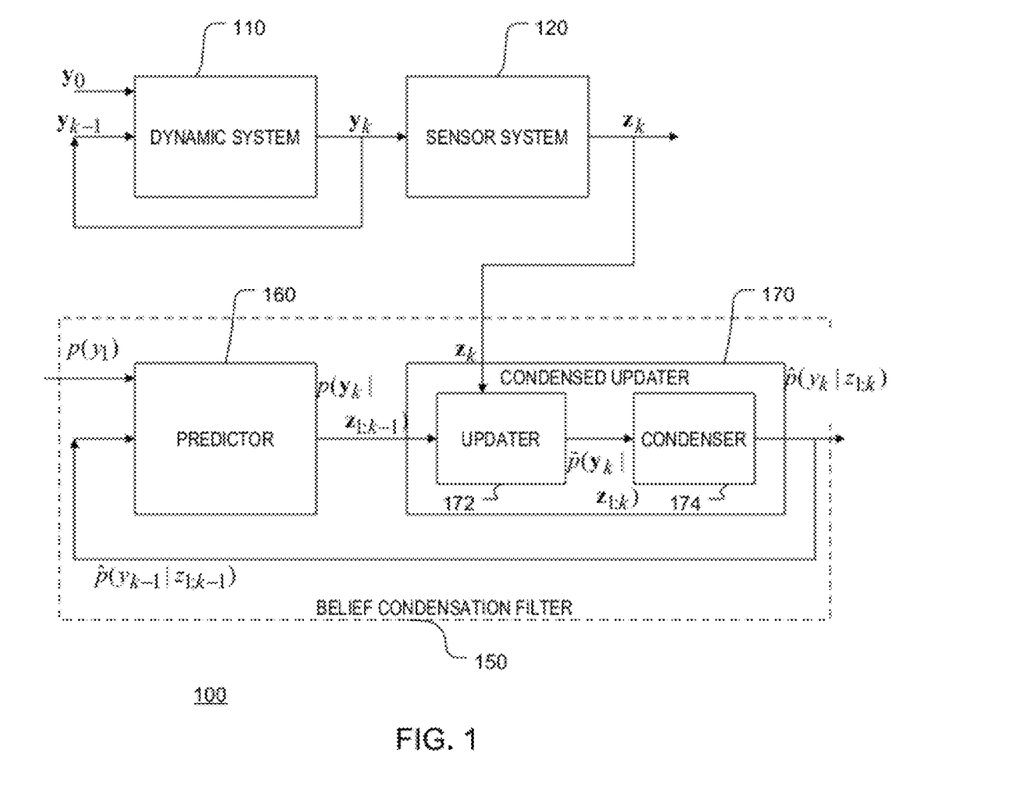
FIG. 1 is a block diagram of showing an example of a Belief Condensation Filter.

Referring to FIG. 1, in one embodiment, a tracking system 100 makes use of a Belief Condensation Filter (BCF) 150 to track a state of a dynamic system 110 that is observed via a sensor system 120. Generally, the system approaches the problem of tracking in an iterative manner similar to existing tracking approaches in which at each iteration, system begins with a posterior probability distribution $p(y_{k-1}|z_{1:k-1})$ of the system state $y_{k-1}$ at time $t_{k-1}$.

In the discussion below, we assume that the state $y_k$ of dynamic system 110 is represented as a vector of real-valued quantities. Furthermore, in at least some embodiments, the system state is assumed to evolve according to a known probabilistic model, for example, a linear Gaussian model $y_{k+1}=H_k y_k+n_k$ in which $n_k$ is a Gaussian random variable. In other embodiments, the state evolution is assumed to be according a more generally non-linear non-Gaussian model $p(y_k|y_{k-1})$. Similarly, the sensor system is assumed to provide an observation according to a model $p(z_k|y_k)$.

As introduced above, exact filtering is not possible using available techniques for continuous-state models in general cases where dynamic or measurements models are nonlinear and/or non-Gaussian. In those cases the exact posterior distribution in each time step cannot be determined in closed-form based on the prediction and update steps, and hence one approach is to track the sequence of posterior distributions through approximations. Referring to FIG. 1, such a series on approximate posterior distributions $\hat{p}(y_k|z_{1:k})$ is calculated by a Belief Condensation Filter (BCF) 150 that makes use of the sensor measurements $z_k$.

Generally, the BCF approximates the complex distributions emerging in the filtering steps by a parametric distribution that is suitable for inference and propagation in next time instants. In some examples, the approximate distributions computed by the BCF belong to a family of distributions $\mathcal{F}$ that belongs to exponential families or mixtures of exponential families. As an example, the BCF 150 calculates distributions $\hat{p}(y_k|z_{1:k})$ that are mixtures of multivariate Gaussian distributions.

At least conceptually, and in some implementations using modules and/or software procedures corresponding to the steps, the BFC 150 can be considered to implement the following steps:

a) Prediction step: Determine $\hat{p}(y_k|z_{1:k-1})$ from $p(y_k|y_{k-1})$ and $\hat{p}(y_{k-1}|z_{1:k-1})$, where $\hat{p}(y_{k-1}|z_{1:k-1})$ belongs to the prescribed family of distributions $\mathcal{F}$. In some examples, this step is performed separately, and in some examples is performed as part of the update step, for example, during pointwise evaluation of $\tilde{p}(y_k|z_{1:k})$ as defined below.

b) Update step: Determine $\tilde{p}(y_k|z_{1:k})$ from $\hat{p}(y_k|z_{1:k-1})$, $p(z_k|y_k)$, and $z_k$, where $\tilde{p}(y_k|z_{1:k})$ does not in general belong to the prescribed family of distributions $\mathcal{F}$. In some examples, $\tilde{p}(y_k|z_{1:k})$ is determined in a parametric form. In some examples, $\tilde{p}(y_k|z_{1:k})$ is determined such that it may be evaluated or approximated pointwise by a numerical procedure. In some examples, an un-normalized function $\tilde{f}(y_k) \propto \tilde{p}(y_k|z_{1:k})$ is determined.

c) Condensation step: Determine $\hat{p}(y_k|z_{1:k})$ as an approximation of $\tilde{p}(y_k|z_{1:k})$ by selecting a member of the family of distributions $\mathcal{F}$ that best matches $\tilde{p}(y_k|z_{1:k})$ (or $\tilde{f}(y_k)$).

Referring to FIG. 1, in some implementations, at the start of the computation for time $t_k$, k>1, a predictor module 160 accepts a parametric representation of $\hat{p}(y_{k-1}|z_{1:k-1})$. As an example, in the case that the family of distributions $\mathcal{F}$ is an m element (component) mixture of multivariate Gaussian distributions, the parametric representation may comprise mixture weights $\{\alpha_i\}$, means $\{\mu_i\}$, and covariances $\{\Sigma_i\}$, for $1 \leq i \leq m$. In general in the discussion below, the variable $\xi$ is used to refer to the complete set of parameters representing such a parametric distribution, such that in the case of the Gaussian mixture, $\xi=(\{\alpha_i, \mu_i, \Sigma_i\}, i=1, \ldots, m)$; and the variable $\theta_i=(\mu_i, \Sigma_i)$ is used to refer to the parameters for the $i^{th}$ element of the mixture distribution.

The predictor 160 determines and outputs a representation of the predicted distribution $\hat{p}(y_k|z_{1:k-1})$. For example, in a case that the system dynamics are linear-Gaussian, (i.e., determined by the system matrix $H_{k-1}$ and mean and covariance of the input $n_{k-1}$), the representation of the distribution is again a Gaussian mixture representable by the set of mixture weights, means, and covariances of the mixture elements.

A condensed updater 170 accepts the representation of $\hat{p}(y_k|z_{1:k-1})$ and the sensor measurement $z_k$, and outputs a representation of the updated distribution $\hat{p}(y_k|z_{1:k})$. For example, in the case of the family of distributions $\mathcal{F}$ being m-element mixtures of Gaussian distributions, the output of the condensed updater 170 is again a set of mixture weights, means, and covariances of the mixture elements.

In some implementations, the condensed updater 170 is implemented by an updater 172 followed by a condenser 174. The updater 172 accepts the representation of $\hat{p}(y_k|z_{1:k-1})$ and the sensor measurement $z_k$. The updater is configured with or accepts a representation of the measurement distribution $p(z_k|y_k)$. In general, this distribution does not have a Gaussian form. For example, the distribution of $z_k$ may depend in significantly non-linear fashion on the system state $y_k$. In some examples, the updater 172 outputs a representation of the updated distribution $\tilde{p}(y_k|z_{1:k})$. Such a representation may comprise parameter values for a parametric distribution. In some examples, the representation may comprised parameter values for configuring a numeric procedure for pointwise evaluation of the function. In some examples, rather than providing the representation of $\tilde{p}(y_k|z_{1:k})$, which might allow evaluation of the distribution value at specific points $y_k$ in the state space, the updater may be configured to accept specific points $y_k$ in the state space and evaluate (or approximate) $\tilde{p}(y_k|z_{1:k})$ at those specific points.

The condenser 174 then forms the approximation $\hat{p}(y_k|z_{1:k})$ corresponding to the distribution $\tilde{p}(y_k|z_{1:k})$ produced by the updater 172. The distribution $\hat{p}(y_k|z_{1:k})$ belongs to the family of distributions $\mathcal{F}$, and for the discussion below, is assumed to be parameterized by a set of parameters $\xi_k$.

In some examples, it is not possible to determine $\xi_k$ in closed form based on the representation of $\tilde{p}(y_k|z_{1:k})$ provided by the updater. In some examples, an iterative procedure is used to determine a sequence of parameters $\xi_k^{[n]}$, for $n=1, 2, \ldots$, which approaches or converges to the best approximation of $\tilde{p}(y_k|z_{1:k})$ in the family of distributions $\mathcal{F}$. For example, an initial value of $\xi_k^{[1]}$ may be the value of $\xi_{k-1}$, which characterizes $\hat{p}(y_{k-1}|z_{1:k-1})$.

In some examples, the quality of the approximation is measured according to a Kullback-Leibler divergence, defined as $$D_{KL}(g(y)\|h(y)) = \int_y g(y) \log \frac{g(y)}{h(y)} dy,$$

for two distributions, $g(y)$ and $h(y)$ is used as quantity that determine the degree to which $\hat{p}(y_{k-1}|z_{1:k-1})\hat{p}(y_k|z_{1:k})$ approximates $\tilde{p}(y_k|z_{1:k})$. Specifically, the sequence of parameters $\xi_k^{[n]}$, for $n=1,2,\ldots$, is chosen to successively reduce (or approximated with the goal of reducing) the quantity $$d_k^{[n]} = D_{KL}(\tilde{p}(y_k|z_{1:k})\|\hat{p}^{[n]}(y_k|z_{1:k}))$$

where $\hat{p}^{[n]}(y_k|z_{1:k})$ is parameterized by $\xi_k^{[n]}$, at each iteration for $n=1,2,\ldots$.

Notice that for any constant $C>0$ $$\int Cp(x) \log \frac{Cp(x)}{q(x)} dx = C \cdot D(p(x)\|q(x)) + C \cdot \log C$$

and therefore it is only necessary to know the distribution $\tilde{p}(y_k|z_{1:k})$ to condense up to a constant.

In some examples, the procedure for determining the successive parameter values $\xi_k^{[n]}$ follows a procedure that is similar to the Expectation-Maximization (EM) Algorithm (Dempster, A. P.; Laird, N. M.; Rubin, D. B. (1977). "Maximum Likelihood from Incomplete Data via the EM Algorithm". *Journal of the Royal Statistical Society. Series B (Methodological)* 39 (1): 1-38.)

In the case of a mixture distribution $\hat{p}(y_k|z_{1:k}) = \Sigma_j \alpha_j q_j(y_k; \theta_j)$, for instance when each distribution $q_i(y_k; \theta_i) = \mathcal{N}(y_k; \mu_i, \Sigma_i)$ is Gaussian, the iteration can be expressed as follows. (For simplicity, the subscript k and the conditional dependence on $z_{1:k}$ are omitted in certain equations below, and $\hat{p}(y_k|z_{1:k})$ is represented by $q(y; \xi^{[n]}) = \Sigma_j \alpha_j q_j(y; \theta_j^{[n]})$.)

for $i=1, \ldots, m$ do $$\left\{
\alpha_i^{[n+1]} = \mathbb{E}_{q_i(y;\theta_i^{[n]})}\left\{\frac{\alpha_i^{[n]} \tilde{p}(y)}{q(y; \xi^{[n]})}\right\} \Big/ \sum_i \alpha_i^{[n+1]} = 1
\right.$$

$$\mu_i^{[n+1]} = \frac{\mathbb{E}_{q_i(y;\theta_i^{[n]})}\left\{\frac{\alpha_i^{[n]} \tilde{p}(y)}{q(y; \xi^{[n]})} y\right\}}{\alpha_i^{[n+1]}}$$

$$\Sigma_i^{[n+1]} = \frac{\mathbb{E}_{q_i(y;\theta_i^{[n]})}\left\{\frac{\alpha_i^{[n]} \tilde{p}(y)}{q(y; \xi^{[n]})} (yy^T)\right\}}{\alpha_i^{[n+1]}} - \mu_i^{[n+1]}(\mu_i^{[n+1]})^T$$

$$\}$$

Note that it is not required that each of the element distributions $q_i(y;\theta_i)$ is Gaussian. Other distributions in an exponential family can be used, and rather computing weighted expectations of statistics $y$ and $yy^T$, as shown above in the Gaussian example, appropriate other statistics are used in the analogous manner that other statistics are used in parameter estimation using the EM Algorithm.

The main complexity of procedure outlined above is evaluating expectations of the form $\mathbb{E}_{q(\cdot)}\{\tilde{p}(\cdot)f(\cdot)\}$, where $\tilde{p}(\cdot)$ is the distribution to condense, $q(\cdot)$ is a distribution in an exponential family, an $f(\cdot)$ is an elementary function. Since the expectations are taken with respect to a member of an exponential family, the required integrations can be efficiently computed.

Numerical integration methods require several evaluations of the integrand. In the following we call M the number of evaluations required by a numerical integration method. Monte Carlo techniques for numerical integration evaluate the integrand in randomly chosen points while quadrature rules obtain deterministically such points. Monte Carlo techniques can approximate very general integrals at the expenses of needing high values of M. In our case we need to compute expectations with respect to tractable distributions, this fact can be used to improve the numerical integration. For example, if $q(\cdot)$ is a Gaussian distribution, very efficient quadrature rules are known, where for state vectors of dimension n, only $M=2n$ or $M=n^2+1$ point-wise evaluations are needed to obtain cubature formulae of degree 3 or 5. These quadrature rules need values of M several orders of magnitude smaller than Monte Carlo methods, and they scale linearly or quadratically with the dimension of the state vector. The remaining complexity lies in the evaluation of $\tilde{p}(\cdot)$ in the M points used in the cubature formulae. Notice that $\tilde{p}(\cdot)$ can be evaluated in the same points for all the expectations in each iteration (i.e., for each value of n).

The point evaluation of $\tilde{p}(\cdot)$ in can be efficiently performed because the distribution $\hat{p}(y_{k-1}|z_{1:k-1})$ is a mixture of distributions belonging to exponential families. In particular, let $$\hat{p}(y_{k-1}|z_{k-1}) = \sum_{i=1}^{m} \alpha_i q_i(y_{k-1})$$

then $$\tilde{p}(y_k) \propto p(z_k|y_k) \cdot \int p(y_k|y_{k-1})\hat{p}(y_{k-1}|z_{1:k-1})dy_{k-1} =$$

$$p(z_k|y_k) \cdot \sum_{i=1}^{m} \alpha_i \mathbb{E}_{q_i(y_{k-1})}\{p(y_k|y_{k-1})\}$$

Therefore, the complexity of the point evaluation of $\tilde{p}(\cdot)$ lies only in the m expectations over the distribution $q_i(y_{k-1})$ of the function $p(y_k|y_{k-1})$ which is easy to evaluate. Moreover, if the dynamic model is linear and Gaussian, and the distribution $\hat{p}(y_{k-1}|z_{1:k-1})$ is a mixture of Gaussians, evaluation of $\tilde{p}(\cdot)$ is trivial since the expectations involved can be easily obtained in closed-form.

In summary, the computational complexity lies in the computation of integrals in each iteration of the BC process, and the complexity of these computations depends on the number of evaluations of elemental functions needed. The number of the point-wise evaluations needed is M or $M^2$ depending on whether the prediction step can be computed analytically or not. In addition, the tractability of the exponential families used in the BC process can lead to efficient quadrature rules which need small values of M.

Figure 4A:
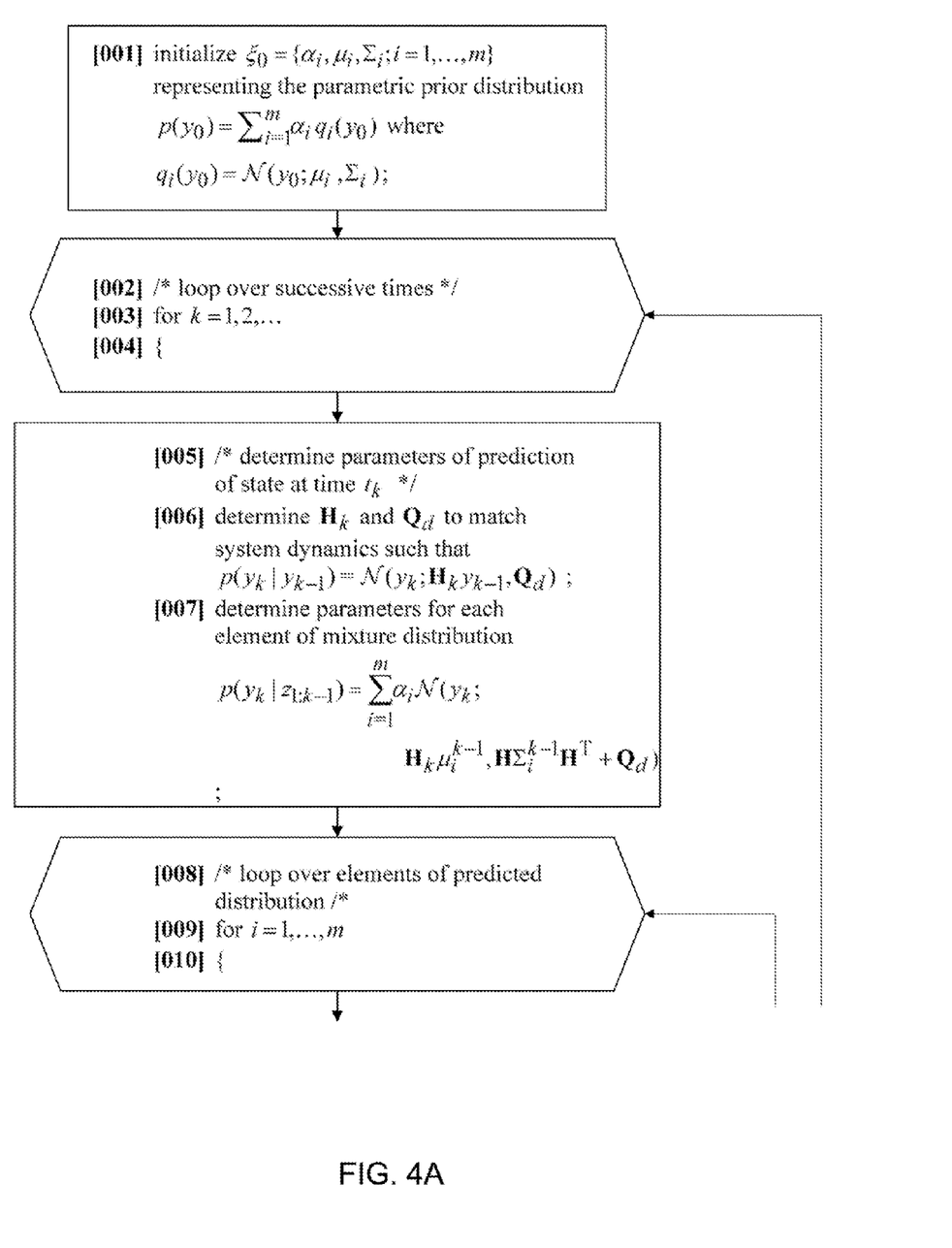
FIGS. 4A-C are a pseudocode listing of a procedure applied to an example using mixtures of Gaussian distributions.
Figure 4B:
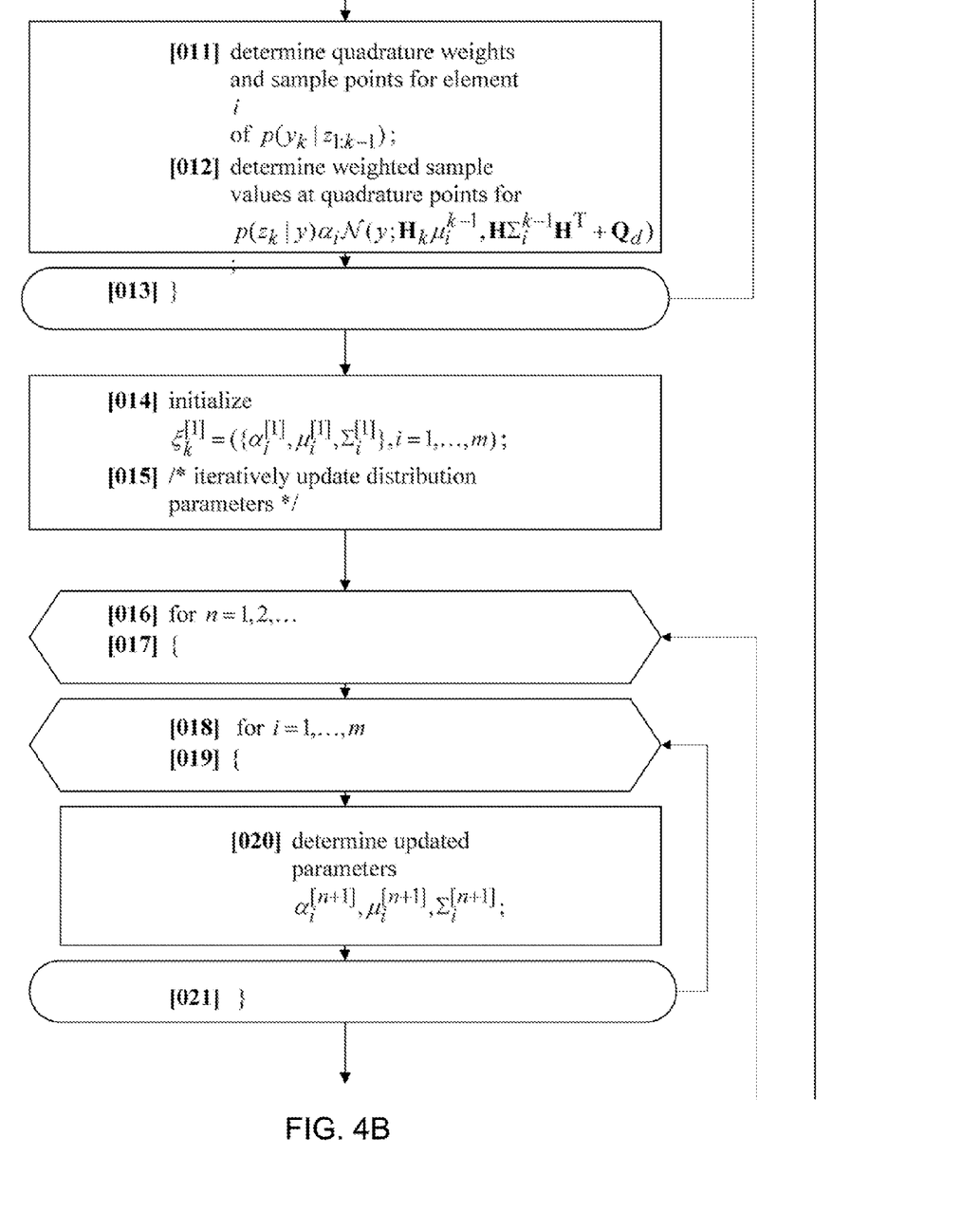
Figure 4C:
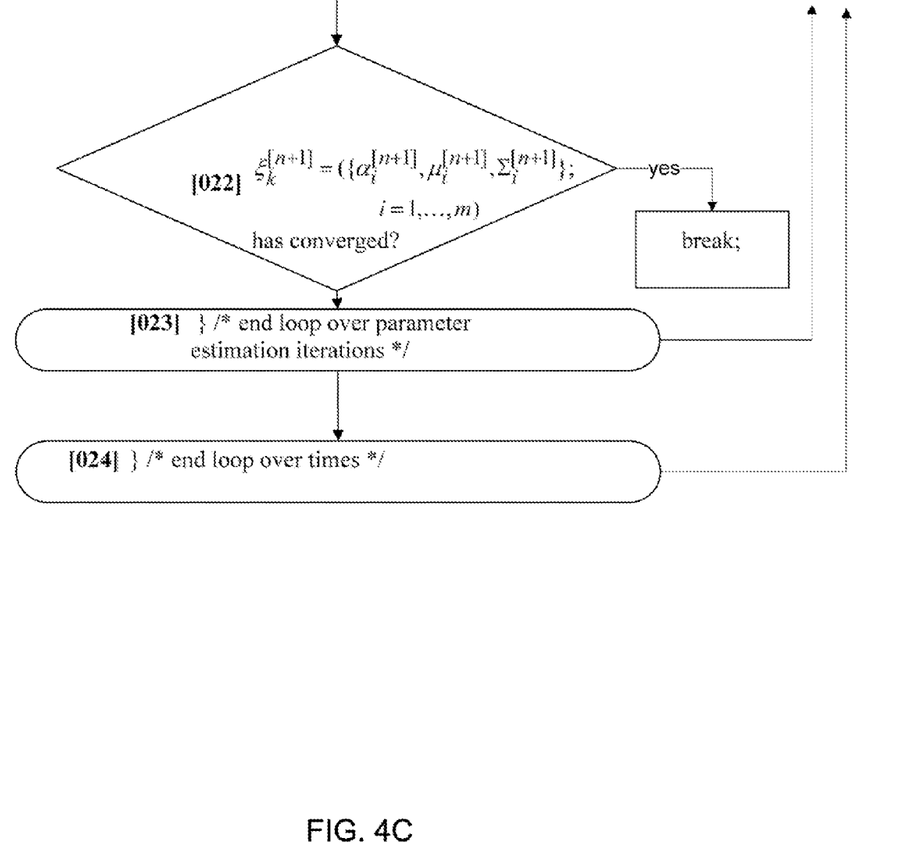

We now describe the implementation for the specific case where the dynamic model is Gaussian and linear, and the family $\mathcal{F}$ is mixtures of Gaussians. Pseudocode for implementation case is shown in FIGS. 4A-C. Note that in general, a different family $\mathcal{F}_k$ of distributions may be used for each time step. For example, the number of mixture elements may be changed over time, or various parametric constraints on each of the mixture elements (e.g., requiring a diagonal covariance) or relating the mixture elements (e.g., using a common covariance) may be changed over time.

Due to the easiness of the prediction step, this particular case leads to a relatively simple BCF implementation.

At time $t_k$ ($k \in \mathbb{N}$), if
$\hat{p}(y_{k-1}|z_{k-1}) = \sum_{i=1}^{m_{k-1}} \alpha_i q_i(y_{k-1}) \in \mathcal{F}_{-1}$ is the posterior obtained at time $t_{k-1}$, where $\alpha_i \in \mathbb{R}^+$, $\sum_{i=1}^{m_{k-1}} \alpha_i = 1$, and $q_i(y_{k-1}) = \mathcal{N}(y_{k-1}; \mu_i^{k-1}, \Sigma_i^{k-1})$, for i=1, ..., $m_{k-1}$,
$z_{1:k}$ is the set of measurements obtained up to and including time $t_k$, and
$p(y_k|y_{k-1}) = \mathcal{N}(y_k; H_k y_{k-1}, Q_d)$ and $p(z_k|y_k)$ are the dynamic and measurements models, respectively;
then, the approximate posterior distribution in time $t_k$, $\hat{p}(y_k|z_{1:k})$ is obtained as the condensation in $\mathcal{F}$ of $$\tilde{p}(y_k) \propto p(z_k|y_k) \cdot \sum_{i=1}^{m_{k-1}} \alpha_i \mathcal{N}\left(y_k; H_k \mu_i^{k-1}, H \sum_i^{k-1} H^T + Q_d\right)$$

Notice that in this case the distribution to condense is easy to evaluate point-wise. Therefore, each expectation in the iterations of the filter needs M evaluations of elemental functions, where M can be small since efficient quadrature rules for expectations over Gaussian distributions can be applied.

The pseudocode of FIGS. 4A-C provide an outline of an implementation of a tracking procedure based on a family of mixture of Gaussian distributions. Initially, parameters $\xi_0$ of a prior distribution of the state are set (line [001]), and then the procedure iterates over successive times k (lines [003]-[024]). At each time. A predictor step (lines [006]-[007]) determines parameters of m components of a mixture distribution for $p(y_k|z_{1:k-1})$. A loop over the components of the mixture (lines [009]-[013]) is used to determine weighted same values of the updated distribution given the new sensor measurement $z_k$ at quadrature points of each of the mixture components. Then, an iterative procedure (lines [014]-[023]) is used to iteratively refine parameter values $\xi_k$ (i.e., for the time k) to best match the weighted sample values.

The approaches described above can be applied to a navigation task in which x(t) and o(t) denote the position and orientation of the agent node at time t, where o(t) can be represented by a rotation vector Both x(t) and o(t) can be modeled as analytic functions of time. Hence, at each time $t_k$, they can be approximated by truncated Taylor expansions. For example, for the position at time $t_k$ we have $$x_{k+1} \approx x_k + x'_k(t_{k+1} - t_k) + \ldots + x_k^{(n)} \frac{(t_{k+1} - t_k)^n}{n!}$$

where the error of this approximation is $$x^{(n+1)}(t^*) \frac{(t_{k+1} - t_k)^{n+1}}{(n+1)!}$$

and t* is some point in the interval $[t_k, t_{k+1}]$.

The dynamic model can be written as $$y_{k+1} = H_k y_k + n_k$$

where the matrix $H_k$ is obtained from the Taylor series expansions, and the approximation error $n_k$ can be modeled as a random variable. Commonly this error is modeled as a zero-mean Gaussian variable (i.e. a discrete Wiener process). Thus, the dynamic model for the state vector in navigation can be considered as linear and Gaussian with a wide generality.

Navigation systems can use a variety of measurements obtained by multiple sensors such as radio frequency (RF) receivers, the global positioning system (GPS) receivers, inertial measurements units (IMU), Doppler sensors, compasses, etc. The set of measurements obtained by the agent in each time instant $t_k$ form the vector $z_k$. The relationship between the positional state vector and $z_k$ can be described by the likelihood model $p(z_k|y_k)$ as introduced above.

In one example of a navigation system, we focus on the case in which the agents obtains IMU and GPS measurements in harsh environments. An IMU device takes two kinds of measurements; the angular velocity about the body frame, $z^\omega$, and the force $z^f$ measured by gyros and accelerometers, respectively.

The gyro measurement for angular velocity at each time instant is given by $$z^\omega = w + b_{in}^\omega + S_{in}^\omega w + n^\omega$$

where $w \in \mathbb{R}^3$ is the true angular velocity, $b_{in}^\omega \in \mathbb{R}^3$ and $S_{in}^\omega \in \mathbb{R}$ are in-run bias and scale factor (both following linear-Gaussian dynamics), and $n^\omega \in \mathbb{R}^3$ is a Gaussian vector with zero mean and covariance matrix $K^\omega$. Hence, $p(z_k^\omega|y_{ki})$ is a Gaussian distribution with mean $w + b_{in}^\omega + S_{in}^\omega w$ and covariance matrix $K^\omega$.

Similarly, the measurement for the force at each time instant is given by $$z^f = f + b_{in}^f + S_{in}^f f + n_f = (1 + S_{in}^f) \cdot C^\dagger(o) \cdot (a-g) + b_{in}^f + n^f$$

where $a, f \in \mathbb{R}^3$ are the true acceleration and force, respectively, $g \in \mathbb{R}^3$ is the gravity, $b_{in}^f \in \mathbb{R}^3$ and $S_{in}^f \in \mathbb{R}$ are in-run bias and scale factor (both following linear-Gaussian dynamics), and of $n^f \in \mathbb{R}$ is a Gaussian vector with zero mean and covariance matrix $K^f \in \mathbb{R}^{3 \times 3}$. Moreover, $C(o) \in \mathbb{R}^{3 \times 3}$ can be written, by the Rodrigues' rotation formula, as $$C(o) = I + \frac{\sin\|o\|}{\|o\|}[o]_x + \frac{1-\cos\|o\|}{\|o\|^2}[o]_x^2$$

where $[o]_x$ is the skew-symmetric form of the rotation vector $$[o]_x = \begin{pmatrix} 0 & -o_z & o_y \\ o_z & 0 & -o_x \\ -o_y & o_x & 0 \end{pmatrix}.$$

Hence, $p(z_k^f | y_k)$ is a Gaussian distribution with mean $(1 + S_{in}^f) \cdot C^\dagger(o) \cdot (a-g) + b_{in}^f$ and covariance matrix $K^f$. Note that the relationship between the force measurement and the state vector is nonlinear.

The measurement of a pseudorange from satellite i with known position $x_i^G$ is given by $$z_i^G = \|x_i^G - x\| + c \cdot b_{t_R} + c \cdot \|x_i^G - x\| S_{t_R} + B_i + b_i + n_i$$

where c is the propagation speed, $b_{t_R}$ and $S_{t_R}$ are the clock bias and drift (both following linear-Gaussian dynamics), $B_i$ is the pseudorange error (following linear-Gaussian dynamics), $b_i$ is the bias due to non-line-of-sight (NLOS) and multipath propagation (following some distribution with nonnegative values), and $n_i$ is the white Gaussian noise.

Note that the relationship between the pseudorange measurements and the state vector is nonlinear. Moreover, the distribution $p(z_k^G | x_k, b_{t_R}[k], S_{t_R}[k], B_i[k])$ is not Gaussian due to the existence of NLOS/multipath bias $b_i$.

Figure 2:
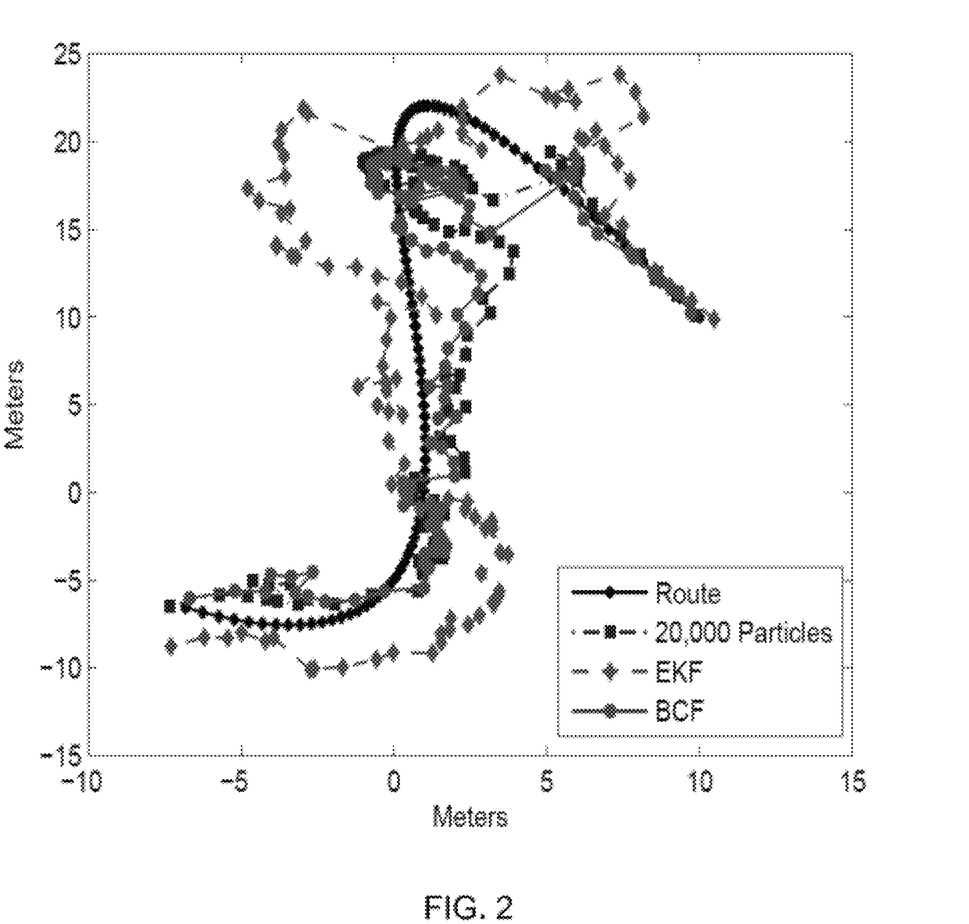
FIG. 2 is a graph comparing performance of a particle filter, an extended Kalman Filter, and the proposed approach.

Below we show the performance of proposed BCF by simulations with measurements emulating sensors' behavior in harsh propagation environments. Consider a scenario where one agent obtains both GPS and IMU measurements. We simulated GPS measurements from 4 satellites in NLOS conditions. The white thermal noise of such measurements was modeled as a Gaussian random variable with zero mean and standard deviation of 2 m, while the positive bias introduced by the NLOS propagation was modeled as an exponential random variable with mean 6 m, 8 m, 10 m, and 14 m for each satellite. The error in the IMU force measurements was modeled as a zero-mean Gaussian random variable with 0.07 N standard deviation, and the error in the angular velocity measurements as $\mathcal{N}(0, 0.02 \text{ rad/sec})$. The motion of the agent was simulated as shown in FIG. 2 with a mean velocity of 1.02 m/sec and a maximum velocity of 2.6 m/sec, the acceleration mean and maximum were 0.122 m/sec$^2$ and 0.267 m/sec$^2$, respectively, and the angular velocity mean was 0.04 rad/sec with a maximum of 0.077 rad/sec.

Figure 3:
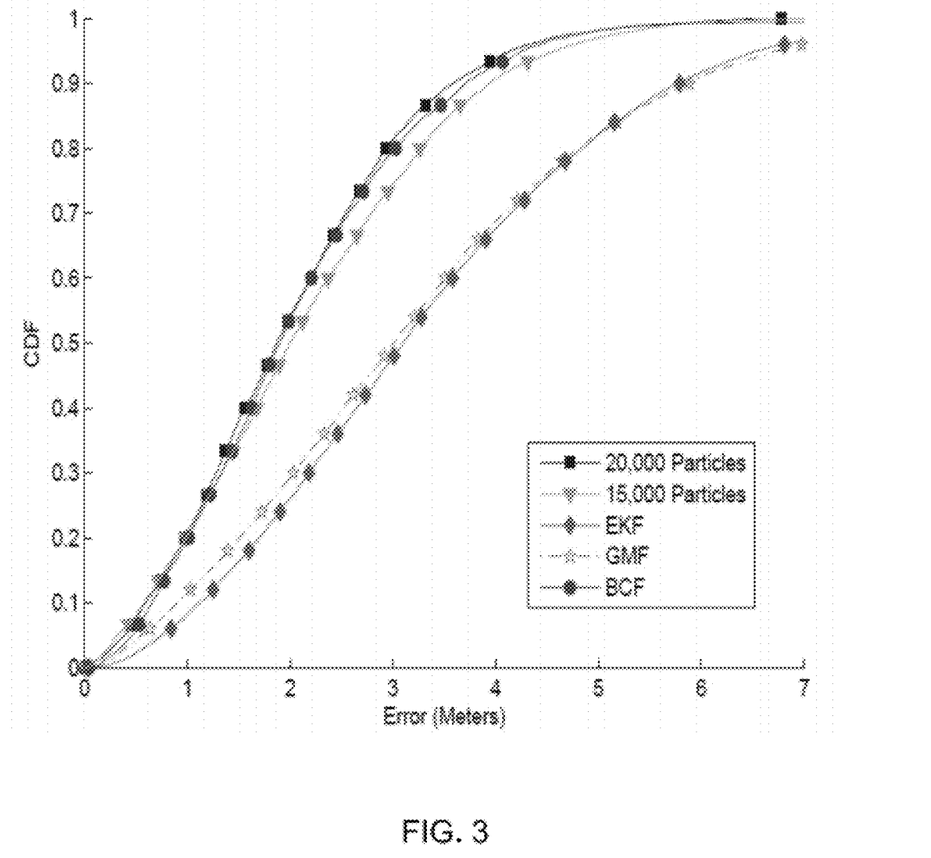
FIG. 3 is a cumulative distribution function of errors in the position obtained by Particle filters, Extended Kalman Filter, Gaussian Mixture Filter, and the proposed approach.

In such scenario we filter the positional state of the agent by using the EKF, the GMF, the sampling importance resampling (SIR) particle filter, and the proposed filter. We simulate 100 positions, where the number of components for the filters using mixtures of Gaussians is N=10 (FIG. 2). In addition, FIG. 3 shows the performance of the filters in 60 Monte Carlo repetitions of the above simulation. From this figure we can observe that the performance of the proposed BCF is close to the that of the particle filter, with an enough number of particles, and much better than those of the EKF and the GMF. In addition, the dimensions of the particle filters shown are 135,000 and 180,000, while the dimension of the BCF based on mixtures of Gaussians is 450 and the dimension of EKF is 44.

Implementations of the approaches described can be implemented in software, in hardware, or in a combination of software and hardware. The software can include instructions stored on a computer-readable medium for causing a data processing system to perform the functions and procedures described above. Hardware can include special-purpose hardware, such as application-specific integrated circuits (ASIC). In some examples, the hardware is represented in a stored software representation using a hardware description language (HDL), such as Verilog. In some implementations, the approach is distributed with some modules being implemented in separate system, for example, in the case of a navigation system, with some modules being implemented on the vehicle being tracked and some modules being implemented remotely from the vehicle.

It is to be understood that the foregoing description is intended to illustrate and not to limit the scope of the invention, which is defined by the scope of the appended claims. Other embodiments are within the scope of the following claims.

What is claimed is:

1. A computer-implemented method for tracking a moving body having state y, according to state-dependent measurements z from one or more sensors, the method comprising:
   acquiring the measurements z at the one or more sensors;
   for time each time $t_k$ of a series of times, processing at least some of the acquired measurements z up to that time $t_k$ using a computer to form and store a computer-readable data representation characterizing a distribution of the state of the body at that time in the series based on the measurements up to that time $t_k$, the distribution for that time $t_k$ belonging to a family of distributions $\mathcal{F}_k$ corresponding to that time $t_k$; and
   determining at least one of a position, a velocity, and a pose of the body at a time $t_k$ using the distribution of the state of the body at that time $t_k$;
   wherein forming the data representation characterizing the distribution of the state of the body at time $t_k$ includes,
   accepting a data representation $\xi_{k-1}$ characterizing a distribution of the state $y_{k-1}$ of the system at a previous time $t_{k-1}$ without consideration of a measurement $z_k$ that depends on the state $y_k$ for the time $t_k$ in the series, the distribution of the state $y_{k-1}$ belonging to a parametric family $\mathcal{F}_{k-1}$,
   accepting a data representation of the measurement $z_k$ that depends on the state $y_k$ for the time $t_k$ in the series,
   forming a first data representation characterizing a first distribution of the state $y_k$ of the body at the time $t_k$ in the series based on the measurements up to the previous time and the measurement for the time in the series, the distribution not belonging the family $\mathcal{F}_k$ corresponding to that time $t_k$,
   determining a second data representation $\xi_k$ characterizing a second distribution of the state $y_k$ of the body at the time $t_k$ in the series based on the measurements up to the previous time and the measurement for the time in the series, the second distribution belonging to the family $F_k$ corresponding to that time $t_k$ and forming an approximation of the first probability distribution of the state $y_k$.

2. The method of claim 1 wherein each family $F_k$ corresponding to each time $t_k$ comprises a family of probability distributions.

3. The method of claim 2 wherein each family $F_k$ corresponding to each time $t_k$ comprises a family of mixture probability distributions.

4. The method of claim 2 wherein each family $F_k$ corresponding to each time $t_k$ comprises a family of mixtures of exponential probability distributions.

5. The method of claim 2 wherein the family of distributions for a plurality of times is a same family.

6. The method of claim 1 wherein the first data representation characterizing a first probability distribution of the state $y_k$ of the system at the time $t_k$ comprises parameters defining a parametric distribution.

7. The method of claim 1 wherein forming the first data representation characterizing a first probability distribution of the state $y_k$ of the system at the time $t_k$ comprises:
forming a data representation characterizing a predicted probability distribution of the state $y_k$ of the system at the time $t_k$ in the series based on the measurements up to the previous time $t_{k-1}$; and
forming the data representation characterizing the first probability distribution from using the measurement $z_k$ for the time in the series and the predicted probability distribution.

8. The method of claim 1 wherein determining the second data representation $\xi_k$ characterizing a second distribution of the state $y_k$ of the system at the time $t_k$ comprises iteratively forming a series of data representations $\xi_k^{[n]}$ representing corresponding successive approximations of first probability distribution of the state of the body.

9. The method of claim 8 wherein iteratively forming the series of data representations comprises, at each iteration, determining expected values of statistics of a distribution of the state of the body based on the measurement $z_k$ for the time in the series and the first probability distribution of the state of the body.

10. The method of claim 1 wherein accepting the data representation of the measurement $z_k$ comprises accepting a data representation of a measurement from a sensor belonging to the group consisting of location-reference based sensor and an inertial sensor.

11. The method of claim 1 wherein the moving body comprises at least one member of a group consisting of a mobile device, a vehicle, and a pedestrian.

12. A tracking system for tracking a moving body having state y, according to state-dependent measurements z from one or more sensors, the tracking system comprising a computer-implemented tracking filter coupled to a sensor system, the tracking filter comprising:
a computer-implemented predictor configured to accept a data representation $\xi_{k-1}$ characterizing a distribution of the state $y_{k-1}$ of the system at a each time $t_{k-1}$ in a series of times without consideration of a measurement $z_k$ that depends on the state $y_k$ for the time $t_k$ in the series, the distribution belonging to a parametric family $F_{k-1}$; and
a computer-implemented updater configured to
accept a data representation of the measurement $z_k$ that depends on the state $Y_k$ for each time $t_k$ in the series of times,
form a first data representation characterizing a first distribution of the state $y_k$ of the body at the time $t_k$ in the series based on the measurements up to the previous time and the measurement $z_k$ for the time in the series, the first distribution not belonging the family $\mathcal{F}_k$ corresponding to that time $t_k$, and
determine a second data representation $\xi k$ characterizing a second distribution of the state $y_k$ of the body at the time $t_k$ in the series based on the measurements up to the previous time and the measurement $z_k$ for the time in the series, the second distribution belonging to the family $F_k$ corresponding to that time $t_k$ and forming an approximation of the first probability distribution of the state $y_k$, and
determine at least one of a position, a velocity, and a pose of the body at a time $t_k$ using at least one of the first and the second distribution of the state $y_k$ of the body at that time $t_k$.

13. The system of claim 12 wherein the moving body comprises at least one member of a group consisting of a mobile device, a vehicle, and a pedestrian.

14. A computer-implemented tracking method comprising:
maintaining a computer-readable data storage for data including data characterizing a distribution of a location of a mobile device as a mixture of a plurality of distribution components;
repeating at each time of a series of times, using a computer,
forming a data representation of a distribution of a predicted location of the device based on the distribution of the location of the device and data representing motion characteristics of the device,
accepting positioning system measurements associated with a location of the device at a sensing time,
forming a data representation characterizing a first distribution of an updated location of the device at the sensing time based on the distribution of the predicted location and the sensor measurements, including identifying a plurality of locations and corresponding weights, and
iteratively updating the data characterizing the distribution of the current location of the device, wherein the distribution of the current location forms an approximation of the first distribution of the updated location according to the identified locations and weights.

15. The method of claim 14 wherein accepting the positioning system measurements includes accepting pseudorange measurements between the device and a plurality of reference locations.

16. The method of claim 15 where the pseudorange measurements are subject to non-linear distortions of true range measurements between the device and the plurality of reference locations.

17. The method of claim 16 wherein the non-linear distortions include at least one or a multipath distortion and a non-line-of-sight distortion.

* * * * *